March 3, 1936.　　　W. H. GILLE　　　2,032,658
MOTORIZED CONTROL MECHANISM
Filed June 17, 1935
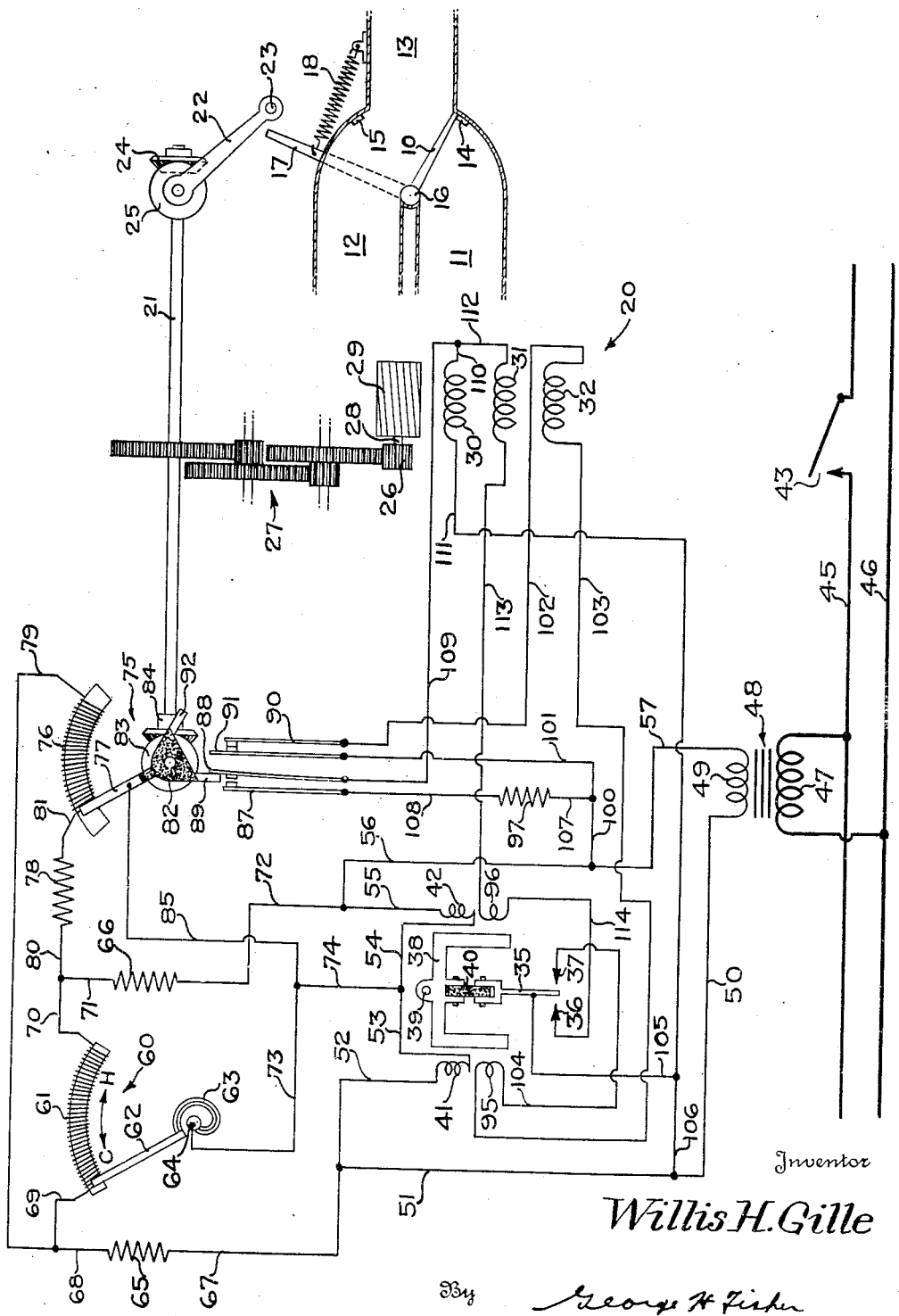
Inventor
Willis H. Gille
By George H. Fisher
Attorney Patented Mar. 3, 1936

2,032,658

UNITED STATES PATENT OFFICE 2,032,658

MOTORIZED CONTROL MECHANISM

Willis H. Gille, St. Paul, Minn., assignor to Minneapolis-Honeywell Regulator Company, Minneapolis, Minn., a corporation of Delaware Application June 17, 1935, Serial No. 26,928

20 Claims. (Cl. 172—239)

The present invention relates to a new and improved power operator or controlling mechanism by means of which dampers, valves, and the like may be positioned. It is often desirable to provide power operators or controlling mechanisms of the type which inherently move to a predetermined position upon interruption of the supply of power thereto. For example, in controlling certain of the dampers of an air conditioning system, it is desirable that they move to a closed position if the supply of electrical power should fail or if a single line switch is moved to open position for the purpose of shutting down the system.

One of the objects of the present invention is the provision of a power operator or controlling mechanism for a member to be controlled, such as a damper or the like which is normally biased to a predetermined position, in which such member is moved away from its biased position by the application of a relatively large amount of power to the operator or controlling mechanism, is maintained in such new position against its bias by the application of a smaller amount of power to the power operator or controlling mechanism, and is permitted to move towards its bias position under the influence of its biasing means by furnishing the power operator or controlling mechanism with a relatively small amount of power which neutralizes or counteracts the similar small amount of power which is utilized to maintain such member in its position removed from its bias position.

More specifically, it is an object of the present invention to provide a controlling mechanism for a member biased to a predetermined position, such as a damper, the controlling mechanism including electric motor means operable to move the member only in a direction away from its biased position and energizing this motor means at a relatively high rate to cause such movement of the member away from its biased position, then energizing the motor means at a lower rate to maintain such member in its new position without further moving the same away from its bias position, and finally energizing the motor means at the same or approximately the same low rate but in a manner to counteract or neutralize the energization thereof that maintains said member in such new position whereby the member moves towards its biased position under the influence of its biasing means.

In the specific form of the invention to be hereinafter described in detail, the motor means takes the form of a rotary electrical motor that is provided with three windings. Energization of the motor means at the aforementioned high rate is obtained by energizing two of these windings whereby the motor develops sufficient power to move the member to be controlled in a direction away from its biased position. Energization of only one of these windings develops sufficient power in the motor to maintain such member in its new position but this amount of power is insufficient to move the member further away from its biased position. The third winding is arranged to counteract or neutralize the magnetic effect produced by such holding winding and, upon energization of this third winding to cause such a counteracting force to be set up, the member to be controlled is thereupon permitted to move towards its biased position, since the motor under these conditions is producing no operative power whatsoever.

This arrangement adapts itself very simply to control by a double-circuit switching mechanism of the type having three positions wherein one or the other of the circuits is closed or wherein both of the circuits are opened. This switching mechanism may be controlled in any desired manner, either manually or automatically, but is preferably controlled in response to changes in a condition or force. Further, in the preferred form of the invention, this switching mechanism is not only controlled by the force or condition but is additionally controlled by the movements of the power operator whereby a proportioning or modulating movement of the member to be controlled is obtained.

Further and more detailed objects will become apparent upon reference to the single drawing, the detailed description, and the appended claims.

For a more complete understanding of the invention, reference may be had to the following detailed description and the accompanying single drawing which is a diagrammatic showing of one form of the present invention.

Referring to this single drawing, the present invention is shown as applied to the control of a damper 10 which controls the flow of fluid from a pair of ducts 11 and 12 to a single duct 13. The duct 11, for instance, may be an outside fresh air duct and the duct 12 may be a recirculated air duct, whereas the single duct 13 may lead to an air conditioner or other treating device after which the air so treated is discharged into a space to be controlled. The damper 10 is movable between the position shown wherein it engages a stop 14 and entirely obstructs the flow of fluid through the duct 11, to a position in which it abuts a stop 15 and entirely obstructs flow of fluid through the duct 12. This damper 10 is secured to a shaft 16 to which an operating arm 17 is also secured. This operating arm 17 is biased to a position in which the damper 10 engages the stop 14 and thereby obstructs the flow of fluid through the duct 11 by means of a spring 18.

The power operator or controlling mechanism for the damper 10 is generally indicated at 20. This power operator includes a main driving shaft 21 which is suitably connected to the operating arm 17. This main operating shaft 21 controls a crank arm 22 that is provided with a crank pin 23 which is adapted to engage the operating arm 17 and rotate the same in a counterclockwise direction against the biasing action of spring 18 and thereby cause movement of damper 10 toward stop 15 and away from stop 14. For simplicity of illustration only, the connection between the main operating shaft 21 and the crank arm 22 is herein shown as comprising a pair of bevelled gears 24 and 25. It will be understood that in actual construction the crank arm 22 would be connected directly to the main operating shaft 21.

This main operating shaft 21 is connected to a motor pinion 26 through a suitable reduction gearing generally indicated at 27. The motor pinion 26 is secured to a rotor shaft 28 which in turn carries a rotor 29. Associated with this rotor 29 are three windings indicated at 30, 31 and 32.

The energizations of these motor windings are primarily controlled by a double-circuit switching mechanism comprising a switch arm 35 and a pair of spaced contacts 36 and 37 between which the switch arm 35 is positioned. The arrangement is such that the switch arm 35 may assume the position shown in which it is disengaged from both contacts 36 and 37, or the switch arm 35 may be selectively positioned into engagement with either of the contacts 36 or 37.

This switch arm 35 may be controlled in any desired manner, either manually or automatically, and is herein shown as controlled automatically by a relay mechanism of the balancing type. This relay mechanism includes an armature 38 which is pivoted at 39. The switch arm 35 is connected to armature 38 through an insulating connection indicated at 40. Associated with the armature 38 is a pair of main relay windings indicated at 41 and 42. It will be apparent upon an inspection of the drawing that energization of the main relay winding 41 causes counterclockwise rotation of armature 38 about its pivotal point 39 whereby to bring switch arm 35 into engagement with contact 37. Similarly, energization of main relay winding 42 causes a clockwise rotation of armature 38 about its pivotal point 39 whereby to move switch arm 35 into engagement with contact 36. It will further be evident that if both these relay windings 41 and 42 are deenergized, or if the same are equally energized, then the armature 38 will assume the intermediate position shown in the drawing wherein switch arm 35 is disposed between contacts 36 and 37 and is disengaged from both of them.

These main relay windings 41 and 42 are normally constantly energized by being connected in series across a suitable source of power. In the instant embodiment of the invention, power is shown as being furnished by line wires 45 and 46 which are connected to the high voltage primary 47 of a step-down transformer 48 through a line switch 48. The main relay windings 41 and 42, in series, are connected across the low voltage secondary 49 of this stepdown transformer 48 by the following circuit: secondary 49, wire 50, wire 51, wire 52, relay winding 41, wire 53, wire 54, relay winding 42, wire 55, wire 56, and wire 57 to the other side of secondary 49.

The respective energizations of main relay windings 41 and 42 are controlled, in part, by a controlling potentiometer, generally indicated at 60. This controlling potentiometer 60 comprises a resistance 61 and a cooperating contact arm 62 which is controlled in accordance with variations in a condition or force. In the particular embodiment of the invention herein disclosed, this cooperating contact arm 62 is shown as positioned by a thermostatic or temperature responsive element 63 which takes the form of a curved strip of bimetal, having one of its ends secured to the contact arm 62 and its other end secured to a post or the like indicated at 64. The controlling resistance 61 is connected in parallel with the series connected main relay windings 41 and 42 through a pair of protective resistances 65 and 66 by wires 52, 67, 68, 69, 70, 71, 72 and 55. The contact arm 62 is connected to the junction of wires 53 and 54, and therefore to the junction of main relay windings 41 and 42, by wires 73 and 74.

The respective energizations of main relay windings 41 and 42 are also controlled by a balancing potentiometer generally indicated at 75. This balancing potentiometer 75 comprises a balancing resistance 76 and a balancing contact arm 77. This balancing resistance 76, and an external resistance 78, in series, are connected in parallel with the controlling resistance 61 by means of wires 79, 80 and 81 and are therefore connected in parallel with the series connected main relay windings 41 and 42, through the same protective resistances 65 and 66.

The balancing contact arm 77 is operated in accordance with the movements of the main operating shaft 21. This balancing contact finger 77 is herein shown as attached to a block of insulating material 82 which is connected to the main operating shaft 21. For the sake of convenience, this block of insulating material 82 is shown connected to the main operating shaft 21 through the medium of a pair of bevelled gears 83 and 84.

The balancing contact arm 77 is connected to the junction of wires 73 and 74 by a wire 85. It will therefore be seen that the controlling contact arm 62, the balancing contact arm 77, and the junction of the main relay windings 41 and 42 are all interconnected.

Certain of the windings 30, 31 and 32, besides being controlled by the double-circuit switching mechanism comprised by the switch arm 35 and associated contacts 36 and 37, are also controlled by limit switches that are actuated as a result of movement of the main operating shaft 21. One of these limit switches is comprised by switch arms 87 and 88, the arm 88 extending into the path of movement of an actuator 89 which is carried by the insulating block 82. The arrangement is such that this limit switch comprised by the switch arms 87 and 88 is moved to open circuit position when the damper 10 is in engagement with stop 14, as will be more fully explained hereinafter. A second limit switch is comprised by switch arms 90 and 91, the arm 91, extending into the path of movement of an actuator 92 which is also carried by the insulating block 82. The arrangement of the limit switch 90—91 and actuator 92 is such that the actuator 92 engages the switch arm 91 to open this limit switch 90—91 when the main actuating shaft 21 moves to that position in which the damper 10 engages the stop 15.

In addition to the main relay windings 41 and 42, the relay mechanism is provided with a pair of auxiliary relay windings 95 and 96 which respectively cooperate with or supplement the main windings 41 and 42. These auxiliary windings 95 and 96 are energized as an incident to energization of certain of the motor field windings 30, 31 and 32, as will hereinafter become apparent. The apparatus further includes a resistance 97. The various circuit connections interconnecting the double circuit switching mechanism 35—36—37, the auxiliary relay windings 95 and 96, the resistance 97, the limit switches, and the motor field windings 30, 31 and 32 will be set forth in the detailed description of the operation of the apparatus which will now be set out.

Operation

With the parts in the position shown, the temperature to which the thermostatic element 63 responds is at or above the highest desired point wherefore the controlling contact arm 62 is engaging the extreme left-hand end of controlling resistance 61. The main relay winding 41 is therefore substantially short-circuited, complete short-circuiting being prevented by reason of the inclusion of protective resistance 65. This substantially complete short-circuit is as follows: from the upper end of relay windings 41, wire 52, wire 67, protective resistance 65, wire 69, control contact arm 62, bimetallic element 63, post 64, wire 73, wire 74, and wire 53 to the lower end of main relay winding 41. Also, the main operating shaft 21 is in an extreme position wherein actuator 89 has opened the limit switch comprised by switch arms 87 and 88 and the balancing contact arm 77 is engaging the extreme left hand end of balancing resistance 76. The main relay winding 42 is therefore also substantially short-circuited, complete short-circuiting in this case being prevented not only by the protective resistance 66 but also by the resistance 78. This partial short-circuit is as follows: from the upper end of main relay winding 42, wire 55, wire 72, protective resistance 66, wire 71, wire 80, resistance 78, wire 81, balancing contact arm 77, wire 85, wire 74 and wire 54 to the lower end of main relay winding 42. If the line switch 43 is now closed, the main relay winding 42 will therefore be somewhat more highly energized than the main relay winding 41 whereupon the armature 38 is rotated somewhat in a clockwise direction and the switch arm 35 engages the contact 36. Under these conditions, the pin 23 of the crank arm 22 has been rotated slightly beyond the actuating arm 17 so that there is a small amount of lost motion between the pin 23 and the arm 17.

Now if the temperature to which the bimetallic element 62 responds should rise, the controlling contact arm 62 will move along the control resistance 61 towards its right-hand end. Such movement of the control contact arm 62 places part of resistance 61 in series with the protective resistance 65, whereby the short-circuiting of main relay winding 41 is rendered less complete. This tends to balance the energizations of main relay windings 41 and 42. When the temperature has risen sufficiently to rebalance the energizations of main relay windings 41 and 42, the switch arm 35 will move to a position between contacts 36 and 37. As the temperature to which bimetallic element 63 responds continues to rise, more and more of the control resistance 61 will be placed in series with the protective resistance 65 to permit more and more current to flow through the main relay winding 41.

When the main relay winding 41 becomes sufficiently more highly energized than the main relay winding 42, the armature 38 will be rotated sufficiently in a counter-clockwise direction to bring switch arm 35 into engagement with contact 37. When this occurs, the field winding 32 and the auxiliary winding 95, in series, are energized as follows: secondary 49, wire 57, wire 100, wire 101, switch arm 91, switch arm 90, wire 102, field winding 32, wire 103, auxiliary winding 95, wire 104, contact 37, switch arm 35, wire 105, wire 106, and wire 50 to the other side of secondary 49. Energization of auxiliary winding 95 causes an additional pull to be applied to the armature 38 tending to rotate the same in counter-clockwise direction whereby the switch arm 35 is held firmly in engagement with contact 37.

The field winding 32, upon energization, causes rotation of motor rotor 29 in such a direction that main operating shaft 21 is rotated in a clockwise direction when viewed from the left. This clockwise rotation of main operating shaft 21 causes clockwise rotation of crank 22, and movement of pin 23 towards actuating arm 17. Also, such rotation of main operating shaft 21 causes clockwise rotation of the insulating block 82 so that balancing contact arm 77 moves towards the right hand of balancing resistance 76 and the actuator 89 permits movement of switch arm 88 towards switch arm 87. It will be noted that during this movement of the main operating shaft 21 there is no load upon the motor since the pin 23 has not as yet engaged the actuating arm 17.

As this clockwise rotation of main operating shaft 21 continues, the limit switch comprised by switch arms 87 and 88 will close whereupon field winding 30 becomes energized by the following circuit: secondary 49, wire 57, wire 100, wire 107, resistance 97, wire 108, switch arm 87, switch arm 88, wire 109, wire 110, field winding 30, wire 111, wire 106 and wire 50 to the other side of secondary 49. A small amount of continued clockwise rotation of main operating shaft 21 causes pin 23 to engage actuating arm 17. The combined energizations of windings 30 and 32 are sufficient to cause movement of damper 10 towards stop 15 against the bias of spring 18. The main actuating shaft 21 therefore continues this clockwise rotation, as viewed from the left, and the damper 10 begins moving away from stop 14 and towards stop 15.

During this time, more and more of the balancing resistance 76 is being placed in series with the protective resistance 66 and the external resistance 78. As a result, the short circuit around main relay winding 42 becomes more and more incomplete so that more and more current flows through this main relay winding 42. The balancing contact arm 77 will soon reach a position wherein the energizations of relay windings 41 and 42 are again sufficiently balanced to cause movement of switch arm 35 from engagement with contact 37. When this occurs, the auxiliary winding 95 and the field winding 32 are both deenergized. Deenergization of auxiliary winding 95 decreases the pull on armature 38 which is tending to move switch arm 35 into engagement with contact 37, whereupon the switch arm 35 will move further away from contact 37 so as to cause a good clean break therebetween. The switch arm 35, under these conditions, is still substantially spaced from the contact 36.

By reason of friction in the various gears and moving parts, energization of the winding 30 alone is sufficient to maintain the damper 10 in its new position against the bias of spring 18 but is insufficient to cause further movement thereof towards the stop 15. In this manner, the damper 10 has been moved to a position corresponding to the new temperature to which the bimetallic element 63 responds. More fresh air and less recirculated air is now passing to the duct 13 for conditioning.

If the temperature to which the bimetallic element 63 responds should continue to rise, or should again rise before falling any, the control contact arm 62 will move further along control resistance 61 towards its right hand end, whereby to again increase the current flow through main relay winding 41. When this temperature rise has been sufficient, switch arm 35 will again engage contact 37 whereupon auxiliary winding 95 and field winding 32 will be again energized. As a result, switch arm 35 is moved firmly into engagement with contact 37 by reason of the energization of auxiliary winding 95 and the main operating shaft 21 is again rotated in a clockwise direction as viewed from the left to move damper 10 further away from stop 14 and closer to stop 15 against the biasing action of spring 18. Such movement of main operating shaft 21 also causes the balancing contact arm 77 to move closer to the right hand end of balancing resistance 76 so as to increase the flow of current through the main relay winding 42, as set forth above. When this movement of main operating shaft 21 has continued sufficiently far, the switch arm 35 will again disengage contact 37 to deenergize the auxiliary winding 95 and the field winding 32 as explained above.

If the temperature to which bimetallic element 63 responds should reach the upper desired limit, then control contact arm 62 will engage the extreme right hand end of control resistance 61 whereupon the relay winding 42 will be substantially short-circuited by the following circuit: From the upper end of relay winding 42, wire 55, wire 72, protective resistance 66, wire 70, control contact arm 62, bimetallic element 63, wire 73, wire 74 and wire 54 to the lower end of relay winding 42. Under these conditions, the main operating shaft 21 will move to an extreme position in attempting to rebalance the energizations of windings 41 and 42. In this extreme position, the actuator 92 engages switch arm 91 and moves the same from engagement with the cooperating switch arm 90. This causes deenergization of the field winding 32 so that further movement of main operating shaft 21 in this direction is prevented. At this time, the damper 10 is engaging stop 15 so that all fresh air and no recirculated air is passing to the duct 13. Under these conditions, the balancing contact arm 77 is engaging substantially the right hand end of balancing resistance 76 so that the relay winding 41 is also substantially short-circuited by the following circuit: from the upper end of relay winding 41, wire 52, wire 67, protective resistance 65, wire 68, wire 79, a small portion of balancing resistance 76, balancing contact arm 77, wire 85, wire 74 and wire 53 to the lower end of relay winding 41. The switch arm 35 is therefore probably barely in engagement with the contact 37.

If the temperature to which bimetallic element 63 responds should now fall, the control contact arm 62 will move away from the extreme right-hand end of control resistance 61 and towards the left-hand end thereof. This places a portion of control resistance 61 in series with the protective resistance 66 whereby the short-circuit of relay winding 42 is made less complete and more current flows through this relay winding 42. Armature 38 is therefore rotated in a clockwise direction whereby to move switch arm 35 towards contact 36. When the temperature to which bimetallic element 63 responds has thus fallen sufficiently, switch arm 35 will engage contact 36. Such engagement of switch arm 35 and contact 36 causes energization of auxiliary winding 96 and field winding 31 by the following circuit: secondary 49, wire 57, wire 100, wire 107, resistance 97, wire 108, switch arm 87, switch arm 88, wire 109, wire 112, field winding 31, wire 113, auxiliary winding 96, wire 114, contact 36, switch arm 35, wire 105, wire 106 and wire 50 to the other side of secondary 49. Energization of the auxiliary winding 96 exerts an additional pull on armature 38, tending to rotate the same in clockwise direction, so that switch arm 35 is held firmly in engagement with contact 36. Energization of field winding 31 counteracts the energization of field winding 30, the magnetic effects produced by these two field windings acting in opposition to each other, so that the motor becomes operatively deenergized.

The spring 18 is thereupon permitted to move damper 10 away from stop 15 and towards stop 14. Such movement of damper 10 also causes counterclockwise rotation of crank arm 22 by reason of actuating arm 17 bearing upon pin 23. As a result, the main operating shaft 21 is rotated in a counter-clockwise direction as viewed from the left. Initial counter-clockwise rotation of main operating shaft 21 allows closure of limit switch 90—91 whereby field winding 32 is again conditioned for energization whenever the switch arm 35 again engages contact 37. This counter-clockwise movement of main operating shaft 21 also causes counter-clockwise movement of the balancing contact arm 77 so that the same moves away from the right hand end of balancing resistance 76 and towards the left hand end thereof.

Such movement of balancing contact arm 77 inserts part of the balancing resistance 76 in series with the protective resistance 65 so that the short circuit of relay winding 41 is made less complete and more current flows through the relay winding 41. When the current flow through relay winding 41 has increased sufficiently, armature 38 is rotated in a counter-clockwise direction so that switch arm 35 disengages contact 36. Auxiliary winding 96 and field winding 31 are thereupon deenergized. Deenergization of auxiliary winding 96 reduces the pull on armature 38 tending to move the same in clockwise direction whereupon switch arm 35 moves further from engagement with contact 36 so as to insure a good, clean break. Deenergization of field winding 31 removes the neutralizing effect so that the field winding 30, which is still energized, becomes operative to maintain the main operating shaft 21 in its new position. The damper 10 has now been moved partially away from stop 15 so that some recirculated air, as well as a large amount of fresh air, is passing to the duct 13.

If the temperature to which bimetallic element 63 continues to fall, the above operation will be repeated. If the temperature falls sufficiently so that control contact arm 62 again engages the extreme left-hand end of control resistance 61, relay winding 41 will again be substantially short-circuited as indicated above. Balancing contact arm 77 will therefore be moved to the left-hand end of balancing resistance 76 but is incapable of rebalancing the energizations of relay windings 41 and 42 by reason of the external resistance 78. This insures that the neutralizing winding 31 will remain energized until the apparatus returns to the position shown, wherein the limit switch 87—88 is open to deenergize both the neutralizing winding 31 and the holding winding 30. Movement of the actuating arm 17 under the influence of spring 18 ceases as soon as damper 10 engages stop 14 but the momentum built up in the main operating shaft 21 and associated reduction gearing causes these parts to continue rotation for a short period whereby the pin 23 moves away from the actuating arm 17 to the position shown.

The resistance 97 serves to limit the flow of current to the coils 30 and 31 and is particularly desirable from a practical standpoint when both the coils 30 and 31 are energized, since when they are both energized and acting in opposition to each other there is substantially no inductance and the current would therefore rise to undesirable and dangerous values, as far as the windings themselves are concerned.

From the foregoing, it will be apparent that if the supply of power to the transformer 48 should be interrupted, as by opening line switch 43 or by reason of a failure of the source of supply, the damper 10 will move to the position shown, whereby no outside air will pass to the duct 13.

It will be readily appreciated that many changes may be made in the details of the invention herein disclosed without departing from the spirit thereof, and I am therefore to be limited only by the scope of the appended claims.

I claim:

1. A control apparatus of the class described, comprising in combination, an operator biased to a predetermined position, rotary electrical motor means coupled to said operator for moving the same away from its biased position against its bias, means to completely energize said motor whereby the same is rendered operative to move the operator away from its biased position, means to partially energize said motor to maintain said operator in such new position by stalling of the motor, an auxiliary winding associated with the motor arranged to counter-act the magnetic effect produced in the motor by such partial energization, and means to energize said auxiliary winding whereby the biasing means is permitted to return said operator to its biased position.

2. A control apparatus of the class described, comprising, in combination, an operator biased to a predetermined position, a rotary electrical motor connected thereto and including a holding winding, an operating winding and a bucking winding, said holding winding being normally energized and operative to maintain said operator against its bias in any position to which it is moved, means to energize said operating winding, the combined efforts of said holding winding and operating winding being sufficient to move said operator to a new position against its bias, and means to energize said bucking winding, said bucking winding operating when energized to counteract the effect of said holding winding to permit movement of said operator towards its biased position.

3. An apparatus of the class described, comprising in combination, an operator biased to a predetermined position, a rotary electrical motor connected thereto, a holding winding for said motor which is normally energized and is operable to hold said operator against its bias in any position to which the operator is moved by stalling of the motor, an operating coil for said motor operable when energized to move said operator to a new position against its bias, a bucking coil for the motor operative to neutralize the effect of said holding coil to permit movement of said operator towards its biased position, and switching means selectively operable to energize said operating coil or said bucking coil.

4. An apparatus of the class described, comprising in combination, an operator biased to a predetermined position, a rotary electrical motor connected thereto, a holding winding for said motor which is normally energized and is operable to hold said operator against its bias in any position to which the operator is moved by stalling of the motor, an operating coil for said motor operable when energized to move said operator to a new position against its bias, a bucking coil for the motor operative to neutralize the effect of said holding coil to permit movement of said operator towards its biased position, switching means selectively operable to energize said operating coil or said bucking coil, and a switch in circuit with said operating coil moved to open position upon movement of said operator to a predetermined position against its bias.

5. An apparatus of the class described, comprising in combination, an operator biased to a predetermined position, a rotary electrical motor connected thereto, a holding winding for said motor which is normally energized and is operable to hold said operator against its bias in any position to which the operator is moved by stalling of the motor, an operating coil for said motor operable when energized to move said operator to a new position against its bias, a bucking coil for the motor operative to neutralize the effect of said holding coil to permit movement of said operator towards its biased position, switching means selectively operable to energize said operating coil or said bucking coil, and a switch in circuit with said holding winding moved to open position upon movement of said operator to its biased position.

6. An apparatus of the class described, comprising in combination, an operator biased to a predetermined position, a rotary electrical motor connected thereto, a holding winding for said motor which is normally energized and is operable to hold said operator against its bias in any position to which the operator is moved by stalling of the motor, an operating coil for said motor operable when energized to move said operator to a new position against its bias, a bucking coil for the motor operative to neutralize the effect of said holding coil to permit movement of said operator towards its biased position, switching means selectively operable to energize said operating coil or said bucking coil, a first switch in circuit with said operating winding, a second switch in circuit with said holding winding, and means to open said first switch upon movement of said operator to a predetermined position against its bias and to open said second switch upon movement of said operator to its extreme biased position.

7. An apparatus of the class described, comprising in combination, an operator biased to a predetermined position, a rotary electrical motor connected thereto, a holding winding for said motor which is normally energized and is operable to hold said operator against its bias in any position to which the operator is moved by stalling of the motor, an operating coil for said motor operable when energized to move said operator to a new position against its bias, a bucking coil for the motor operative to neutralize the effect of said holding coil to permit movement of said operator towards its biased position, switching means selectively operable to energize said operating coil or said bucking coil, and a single switch in circuit with said holding and bucking coils moved to open position upon movement of said operator to its extreme biased position.

8. An apparatus of the class described, comprising, in combination, an operator, a member to be controlled, a one-way connection between said operator and member, means biasing said member to a predetermined position, electric motor means connected to said operator for moving the same in a direction to move said member away from its biased position through said one-way connection, a holding winding for said motor operable to hold said member in any position to which it is moved by said motor, an operating winding for the motor operable to move said member against its bias when energized, a bucking winding for said motor operable to neutralize the effect of said holding winding, means to selectively energize said operating and bucking windings, and a single switch moved to open position upon movement of said member to its extreme biased position, said switch being in circuit both with said holding winding and said bucking winding.

9. In a control system, a member to be regulated, an operator therefor, means biasing said member to a predetermined position, electric motor means associated with said operator for moving said member away from said predetermined position against the action of said biasing means, means to normally energize said motor means sufficiently to maintain said member in any position to which it is moved against its bias, a circuit including a neutralizing winding associated with said motor to neutralize the effect of said normal motor energization, a circuit to energize said motor sufficiently to move said member to a new position against its bias, switching means selectively operable to complete said circuits, and a condition responsive device in control of said switching means.

10. In a control system, a member to be regulated, an operator therefor, means biasing said member to a predetermined position, electric motor means associated with said operator for moving said member away from said predetermined position against the action of said biasing means, means to normally energize said motor means sufficiently to maintain said member in any position to which it is moved against its bias, a circuit including a neutralizing winding associated with said motor to neutralize the effect of said normal motor energization, a circuit to energize said motor sufficiently to move said member to a new position against its bias, switching means selectively operable to complete said circuits, a condition responsive device in control of said switching means, and a switch in circuit with said neutralizing coil moved to open circuit position upon movement of said member to its biased position.

11. In a control system, a member to be regulated, an operator therefor, means biasing said member to a predetermined position, electric motor means associated with said operator for moving said member away from said predetermined position against the action of said biasing means, means to normally energize said motor means sufficiently to maintain said member in any position to which it is moved against its bias, a circuit including a neutralizing winding associated with said motor to neutralize the effect of said normal motor energization, a circuit to energize said motor sufficiently to move said member to a new position against its bias, switching means selectively operable to complete said circuits, a condition responsive device in control of said switching means, and a switch in said second named circuit moved to open position when said member has been moved to a predetermined position away from its biased position.

12. In a control system, a member to be regulated, an operator therefor, means biasing said member to a predetermined position, electric motor means associated with said operator for moving said member away from said predetermined position against the action of said biasing means, means to normally energize said motor means sufficiently to maintain said member in any position to which it is moved against its bias, a circuit including a neutralizing winding associated with said motor to neutralize the effect of said normal motor energization, a circuit to energize said motor sufficiently to move said member to a new position against its bias, switching means selectively operable to complete said circuits, a condition responsive controller, and connections between said motor and condition responsive controller and said switching means by which said switching means is controlled by the conjoint movements of the controller and motor.

13. A control system of the class described, comprising, in combination, a member to be regulated and biased to a predetermined position, a rotary electrical motor, connections between said motor and member including torque amplifying means, a normally energized holding winding for said motor operative to maintain said member in any position to which it is moved against its bias, an operating winding for said motor operative in conjunction with said holding winding to move said member to a new position against its bias when both said windings are energized, a neutralizing winding for said motor operative to counteract the effect of said holding winding whereby said member is free to move towards its biased position upon concurrent energization of said holding and neutralizing windings while said operating winding is deenergized, and a double circuit switching mechanism associated with said operating and neutralizing windings having a position in which both of said windings are deenergized and selectively operable to positions in which either said operating winding or said neutralizing winding is energized.

14. A control system of the class described, comprising, in combination, a member to be regulated and biased to a predetermined position, a rotary electrical motor, connections between said motor and member including torque amplifying means, a normally energized holding winding for said motor operative to maintain said member in any position to which it is moved against its bias, an operating winding for said motor operative in conjunction with said holding winding to move said member to a new position against its bias when both said windings are energized, a neutralizing winding for said motor operative to counteract the effect of said holding winding whereby said member is free to move towards its biased position upon concurrent energization of said holding and neutralizing windings while said operating winding is deenergized, a double circuit switching mechanism associated with said operating and neutralizing windings having a position in which both of said windings are deenergized and selectively operable to positions in which either said operating winding or said neutralizing winding is energized and a switch in circuit with said holding winding and said neutralizing winding moved to open position when said member moves to a predetermined position.

15. A control system of the class described, comprising, in combination, a member to be regulated and biased to a predetermined position, a rotary electrical motor, connections between said motor and member including torque amplifying means, a normally energized holding winding for said motor operative to maintain said member in any position to which it is moved against its bias, an operating winding for said motor operative in conjunction with said holding winding to move said member to a new position against its bias when both said windings are energized, a neutralizing winding for said motor operative to counteract the effect of said holding winding whereby said member is free to move towards its biased position upon concurrent energization of said holding and neutralizing windings while said operating winding is deenergized, a double circuit switching mechanism associated with said operating and neutralizing windings having a position in which both of said windings are deenergized and selectively operable to positions in which either said operating winding or said neutralizing winding is energized and switching means controlled by the movements of said member additionally controlling the energizations of all of said windings.

16. A control system of the class described, comprising, in combination, a member to be regulated and biased to a predetermined position, a rotary electrical motor, connections between said motor and member including torque amplifying means, a normally energized holding winding for said motor operative to maintain said member in any position to which it is moved against its bias, an operating winding for said motor operative in conjunction with said holding winding to move said member to a new position against its bias when both said windings are energized, a neutralizing winding for said motor operative to counteract the effect of said holding winding whereby said member is free to move towards its biased position upon concurrent energization of said holding and neutralizing windings while said operating winding is deenergized, a double circuit switching mechanism associated with said operating and neutralizing windings having a position in which both of said windings are deenergized and selectively operable to positions in which either said operating winding or said neutralizing winding is energized, a condition responsive member, and connections by which said switching mechanism is controlled by the conjoint action of said condition responsive member and the movements of the member to be regulated.

17. In a motorized control apparatus, in combination, a member to be regulated and biased to move in a first direction, rotary electrical motor means coupled to said member for moving the same in a second direction against its bias, a first circuit to energize said motor sufficiently to move said member in said second direction, a second circuit to energize said motor only sufficiently to maintain said member in such new position against its bias without further moving the same in said second direction, a neutralizing winding operative to operatively deenergize said motor whereby to permit movement of said member in said first direction, and means in control of said circuits and said winding.

18. In a motorized controlling mechanism, in combination, a member to be regulated which is biased for movement in a first direction, motor means coupled thereto for moving said member in a second direction away from its bias, a circuit for said motor means to energize the same sufficiently to maintain said member in any position to which it is moved against its bias, a circuit for said motor means to energize the same sufficiently to cause movement of said member in said second direction, a winding for said motor means to operatively deenergize the same when a circuit therethrough is completed whereby said member is free to move in said first direction, and switching means to control said winding and circuits.

19. In a motorized controlling mechanism, in combination, a member to be regulated which is biased for movement in a first direction, motor means coupled thereto for moving said member in a second direction away from its bias, a circuit for said motor means to energize the same sufficiently to maintain said member in any position to which it is moved against its bias, a circuit for said motor means to energize the same sufficiently to cause movement of said member in said second direction, a winding for said motor means to operatively deenergize the same when a circuit therethrough is completed whereby said member is free to move in said first direction, switching means to control said winding and circuits, electrically energizable means in control of said switching means, and resistance means, including a portion controlled by movements of said member, in control of the electrically energizable means.

20. In a motorized controlling mechanism, in combination, a member to be regulated which is biased for movement in a first direction, motor means coupled thereto for moving said member in a second direction away from its bias, a circuit for said motor means to energize the same sufficiently to maintain said member in any position to which it is moved against its bias, a circuit for said motor means to energize the same sufficiently to cause movement of said member in said second direction, a winding for said motor means to operatively deenergize the same when a circuit therethrough is completed whereby said member is free to move in said first direction, switching means to control said winding and circuits, electromagnetic means in control of said switching means at least two variable resistance means associated with said electromagnetic means for controlling the energization thereof, and connections between said motor means and one of said variable resistance means.

WILLIS H. GILLE.